United States Patent

Reichard

[15] 3,701,126

[45] Oct. 24, 1972

[54] STATIC NON-DESTRUCTIVE SINGLE WALL DOMAIN MEMORY WITH HALL VOLTAGE READOUT

[72] Inventor: Robert W. Reichard, Wellesley, Mass.

[73] Assignee: Honeywell Information Systems, Waltham, Mass.

[22] Filed: Jan. 4, 1971

[21] Appl. No.: 103,408

[52] U.S. Cl..340/174 HA, 340/174 M, 340/174 MP, 340/174 TF

[51] Int. Cl...........................G11c 11/14, G11c 11/18

[58] Field of Search.................340/174 TF, 174 HA; 179/100.2 CH

[56] References Cited

UNITED STATES PATENTS

| | | | |
|---|---|---|---|
| 3,521,255 | 7/1970 | Arndt | 340/174 HA |
| 3,470,547 | 9/1969 | Bobeck | 340/174 TF |

OTHER PUBLICATIONS

Electronics, September 1, 1969; pgs 83 to 87

Bell Laboratories Record; June/July 1970 pgs 163 to 169

*Primary Examiner*—James W. Moffitt

*Attorney*—Ronald T. Reiling and Fred Jacob

[57] ABSTRACT

A memory system having single wall domains movable between determinate stable positions and including a Hall probe element matrix arrangement, each element in alignment with one of such positions.

11 Claims, 6 Drawing Figures

INVENTOR

Robert W. Reichard

By John S. Solakian

Attorney

INVENTOR
Robert W. Reichard
By John S. Solakian
Attorney

INVENTOR

Robert W. Reichard

By John S. Solakian
Attorney

STATIC NON-DESTRUCTIVE SINGLE WALL DOMAIN MEMORY WITH HALL VOLTAGE READOUT

BACKGROUND OF THE INVENTION

1. Field of the Invention

This invention relates generally to orthoferrite memories and those memories of other equivalent materials, and more particularly to readout arrangements for such memory systems.

2. Prior Art

Memories made from orthoferrite and other equivalent materials have become well known in the art. See the articles entitled, "Propagation of Cylindrical Magnetic Domains in Orthoferrites," A.J. Perneski, and "Application of Orthoferrites to Domain-Wall Devices, " A.H. Bobeck et al, both of which articles appear in IEEE Transactions on Magnetics, Vol. Mag. -5, No. 3, September 1969. Several U.S. patents relating to orthoferrite memories have also issued. Such U.S. patents include but are not limited to U.S. Pat. Nos. 3,454,939; 3,460,116; 3,470,546; 3,470,547; 3,471,840; 3,503,054; 3,503,055; 3,513,452; 3,516,077; 3,526,883; and 3,530,446. Such articles and patents describe orthoferrite memories which need not be specifically described here.

Generally, however, such orthoferrite memories are capable of including single wall domains which can be moved between determinate stable positions.

Single wall domains occur in sheets of magnetic material that are generally magnetized in a particular direction perpendicular to the two surfaces of the sheet. In such sheets there occur small regions in which the magnetization is in the opposite direction. Such regions are known as single wall domains. For example, if the sheet is generally magnetized so that the magnetic flux emerges from its upper surface and enters the lower surface, in each single wall domain in each sheet, there would be a small area in which the magnetic flux would enter the upper surface and emerge from the lower surface. In memories of this type the domains are movable from one location to another under the stimulus of certain external control magnetic fields. It is a general object this invention to sense whether a domain currently occupies a particular location on the sheet. Further, a single wall domain is a reverse-magnetized region encompassed by a domain wall which closes on itself to form, illustratively, a cylindrical geometry the diameter of which is a function of the orthoferrite material and the surrounding field parameters. Inasmuch as the boundary of the domain is independent of the boundary of the sheet of material, multidimensional movement of the domain can be realized. The Bell System Technical Journal (BSTJ), Vol. 6, No. 8, October 1967, pages 1901 et seq. describes single wall domains, various operations employing the movement of single wall domains, and suitable materials in which those domains can be moved.

In order to be useful, the orthoferrite memory must include a means for sensing the presence of the single wall domains. Most of the patents referenced include means for generating a stream of domains which are fed into a propagation channel and transmitted to an output point. It is only when a domain passes an output point that such domain is sensed by an inductive pickup wire, an optical readout, or a Hall probe element. Also, some of such patents illustrate an orthoferrite memory which includes more than one fixed stable domain position for each information bit position. Movement of a domain through a selected one of such plural domain positions in a bit position is sensed by an induced voltage. It can thus be seen that each of these readout techniques of the prior art requires movement of the single wall domains.

It is therefore an object of this invention to provide an improved readout for use in a single wall domain memory system.

It is a further object of this invention to provide such a readout which does not require movement of the single wall domains of said memory.

Hall probe elements are well known. Such a device generates a voltage across opposite edges of an electrical conductor carrying current and placed in a magnetic field. Current is applied to a pair of control terminals thereof in one direction and the voltage is generated at a pair of sense terminals thereof in a transverse direction when the element is placed in a magnetic field. Some U.S. patents which include inventions based on the so-called Hall effect are U.S. Pat. Nos. 3,003,105, 3,037,199, and 3,521,255. The latter patent illustrates Hall probe elements in a matrix arrangement. Such elements are utilized to readout information stored in a permanently magnetizable material. It has been found that Hall probe elements can be utilized with non-permanently magnetized material which are capable of including single wall domains movable between fixed stable positions.

It is accordingly another object of this invention to provide a single wall domain memory system which includes Hall probe elements as the readout device.

It is yet another object of this invention to provide an improved matrix arrangement of Hall probe elements for utilization with a single wall domain memory.

SUMMARY OF THE INVENTION

The purposes and objects of the invention are satisfied by providing an orthoferrite or equivalent material memory system which includes a first sheet of material in which single wall domains can be maintained at determinate stable positions; a second sheet of material overlying said first sheet and including a plurality of Hall probe elements each in substantial alignment with one of said stable positions, each of said elements including a pair of spaced electrical control connections in one direction and a pair of electrical sense connections in a transverse direction; means for providing current to said control connections of certain ones of said elements thereby energyzing said certain ones of said elements; and means coupled to said sense connections of selected ones of said elements, for sensing the presence or absence of said single wall domains when said certain ones of said elements are energized. Various matrix arrangements of the Hall probe elements are shown, which elements, in combination with the means for selectively energizing and the means for sensing, provide a readout of the position of said single wall domains. The memory system of the invention may be utilized on an electrically alterable read only memory in addition to other applications.

BRIEF DESCRIPTION OF THE DRAWINGS

The advantages of the foregoing configuration of the present invention become more apparent upon reading the accompanying detailed description in conjunction with the figures in which.

DETAILED DESCRIPTION OF THE PREFERRED EMBODIMENTS

Figure 1:
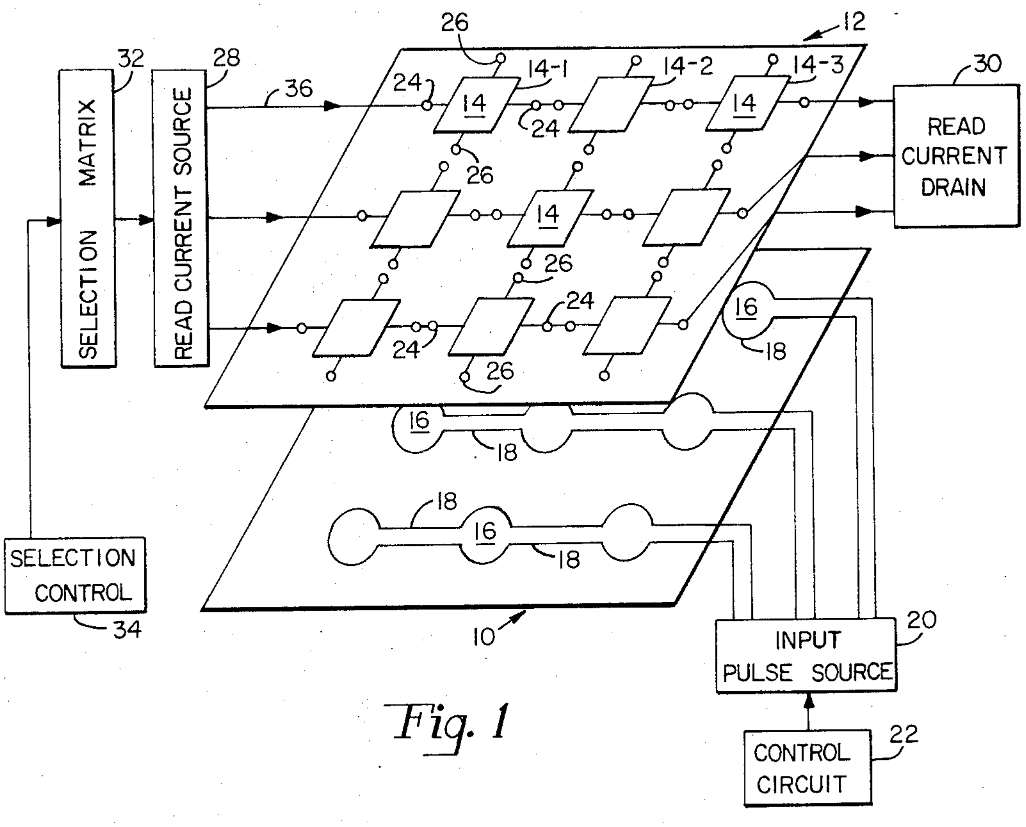
FIG. 1 is an exploded perspective view and block diagram of the memory system of the invention.

FIG. 1 illustrates the orthoferrite or similar material memory system of the invention. The system includes a first sheet of material 10 which is capable of carrying single wall domains movable between determinate stable positions. A second sheet of material 12 overlies the first sheet 10. The second sheet 12 includes a plurality of Hall probe elements 14 which are shown by way of illustration in a three by three matrix array. Each of the Hall probe elements 14 in the second sheet 12 overlie a determinate stable position 16 of the single wall domains included in first sheet 10. As is well known in the orthoferrite memory art, the positions 16 may be determined by a conductive loop configuration which is shown in FIG. 1 by the arrangement of wires 18. Such determinate stable positions may have also been configured by the use of the so-called "angel fish" circuits as well as the so-called "T-bar" circuits. The technique for determining such stable positions is not a part of this invention, nor is the technique for generation of the single wall domains. Propagation of the single wall domains is also not a part of this invention, however such propagation may be induced by means of an input pulse source 20 under control of a control circuit 22. This technique is also well known in the art and will not be further described here.

The single wall domains may be formatted in the first sheet 10 by means of any desirable technique. An electrically alterable read only memory, for example, may thus be formatted. The presence of a single wall domain in determinate stable location 16 provides a magnetic field of first polarity at that position whereas the absence of a single wall domain provides a magnetic field having a second polarity opposite that of the first polarity magnetic field.

It is well known that Hall probe elements may be utilized to detect magnetic fields. Thus by providing a matrix of Hall probe elements 14 overlying the determinate positions 16, a readout may be obtained of the presence or absence of a single wall domain in such positions without moving the single wall domains. The Hall probe elements 14 include a pair of control terminals 24 and a pair of sense terminals 26 oriented in a direction transverse to the control terminals 24. The connections of the sense terminals are not shown in FIG. 1 and will be described hereinafter. The connections of the pairs of control terminals 24 are shown to be connected in a row arrangement by serial connections. A selected row of Hall elements may be energized by means of a current which is provided by the read current source 28. The current is terminated in a read current drain 30 which may be circuit ground. The row receiving read current from source 28 is selected by selection matrix 32 under control of a selection control 34. Each of the elements 28, 30, and 34 are well known in the memory art and will not be discussed here. Thus in operation if a read current is selected to occur on line 36 each of the Hall probe elements 14–1, 14–2, and 14–3 will be energized. By proper connection of the sense terminals 26 associated with these three Hall probe elements, a voltage readout may be obtained of the state of the single wall domains located at these positions. The readout device or sense logic would be sensitive to the polarity of the magnetic field, the first polarity indicating the presence of a single wall domain.

Figure 2:
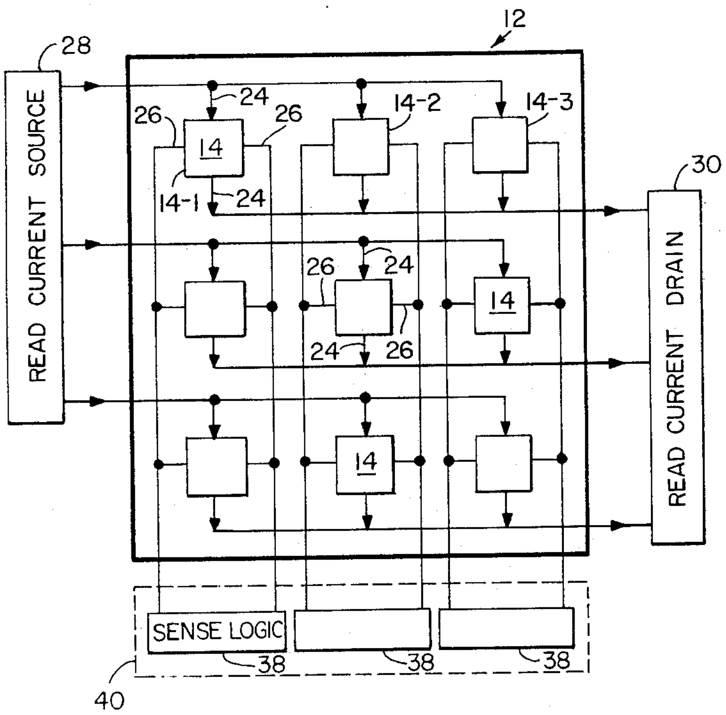
FIGS. 2 through 5 are schematic block diagrams of Hall probe element matrix embodiments which may be utilized in the memory system of the invention.

Not referring to FIG. 2, the second sheet 12 is shown to include a matrix of Hall probe elements 14, which matrix includes a row of such elements having their control terminals 24 connected in a parallel arrangement. Thus the pair of control terminals of Hall probe elements 14–1, 14–2, and 14–3 are in parallel circuit and are energized by read current source 28 when selected by selection matrix 32. The pair of sense terminals 26 of each of the Hall probe elements in a specific column are connected in parallel and coupled to sense logic 38 in utilization circuit 40. When one of the rows of Hall probe elements 14 is energized, each of the sense logic circuits 38, which are equal in number to the number of columns in the matrix arrangement of the Hall probe elements, will either produce a first polarity voltage indication of the presence of a domain or will produce a second polarity voltage indicative of the absence of a domain. The elements of the rows not energized will not produce a voltage readout at the sense terminal thereof. The logic circuits 38 may each include an amplifier,polarity sense circuits and logic circuit readout circuitry. The readout circuitry may also include other circuits for enhancing the readout signal such as integration and corelation circuits.

Figure 3:
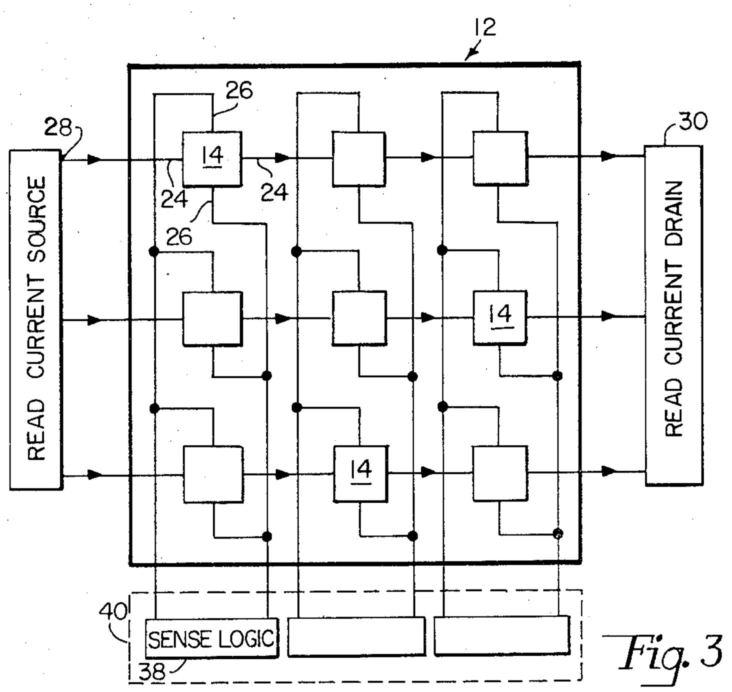

FIG. 3 illustrates another matrix arrangement of the Hall probe elements 14. In this embodiment, the configuration of the sense terminals 26 are connected in a parallel circuit in column arrangement and coupled to sense logic 38 as was the case for the embodiment of FIG. 2. However the read current supplied by source 28 is directed into the control terminals 24 which are connected with the other control terminals of the Hall probe elements in a particular row in a series circuit arrangement. Note that this was the energizing arrangement shown in FIG. 1. The operation of the matrix in FIG. 3 is thus essentially the same as that of the matrix in FIG. 2, the difference being that in the former, the elements in a row are connected in series whereas in the latter, the elements in a row are connected in parallel. The series connection is less complex in electrical line construction and from that consideration would therefore be the more desirable arrangement. A high input impedance of an amplifier in logic circuits 38 would be required however.

Figure 4:
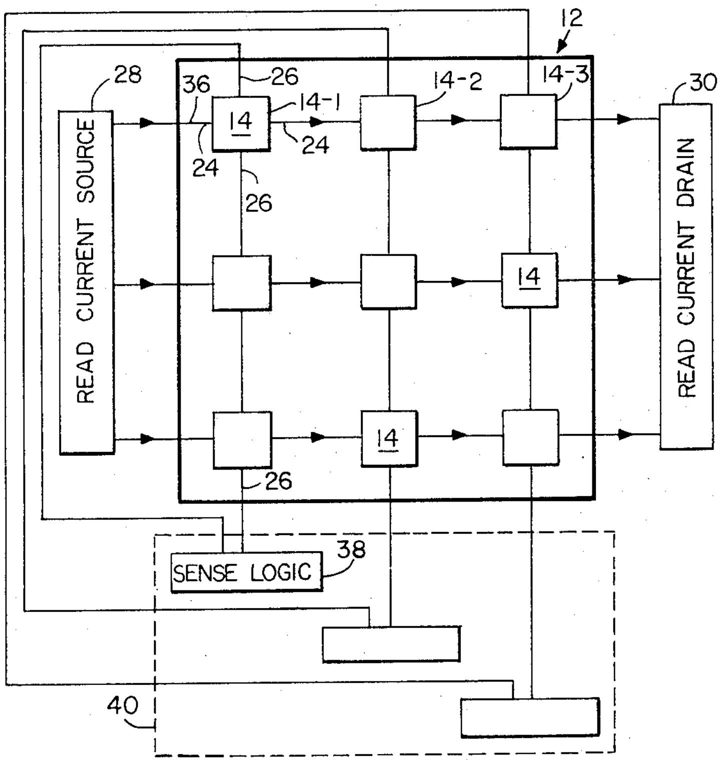

The matrix shown in FIG. 4 includes Hall probe elements 14 which are organized in rows and columns and are energized in a series connected arrangement for each row as was the case for the matrices of FIGS. 1 and 3. In this matrix configuration however, the sense terminals 26 are also coupled in series for each column in such a way that the outer sense terminals of the outer row elements 14 are connected to the sense logic 38. In operation when line 36 receives current, thereby energizing Hall probe elements 14–1, 14–2, and 14–3, a voltage may be generated which is sensed by the sense logic 38. Since the other rows of Hall probe elements 14 are not energized a voltage will not be produced thereby. The series connection of the sense terminals is less complex in electrical line construction than was the parallel connection. Also it should be noted that the series connected sense terminal configuration may also be utilized with the parallel connected control terminal configuration shown in FIG. 2.

Figure 5:
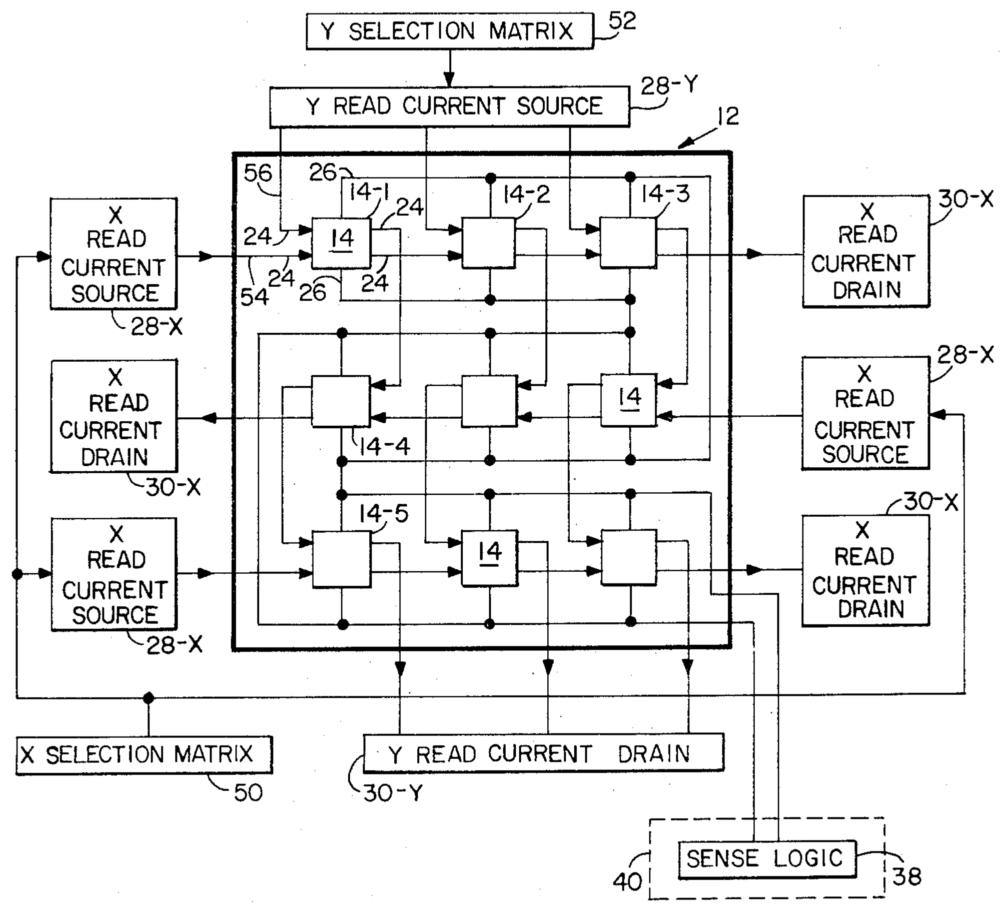

FIG. 5 illustrates a matrix of Hall probe elements which include a single sense line connecting the pairs of sense terminals of each Hall probe element 14 in parallel circuit coupling to a single logic circuit 38 in utilization circuit 40. Each of the Hall probe elements 14 are selected by an X and Y "half-energize" current or coincident current arrangement. Each of the Hall probe elements include dual input control terminals and dual output control terminals. This arrangement may be physical to the Hall probe element itself in that two leads are actually seen on each side of the Hall probe element, or the equivalent of such dual control terminals may be implemented by means of a direct wired coupling or by a gate circuit. The read currents are supplied by X and Y read current sources 28–X and 28–Y respectively. The column output wire coupled to control terminals 24 which receives current from sources 28–Y is selected by means of Y selection matrix 52. As can be seen the Y read currents are directed into and out of the Hall probe elements 14 in an alternate arrangement row by row. The X read currents supplied are selected by X selection matrix 50 and are supplied in a row by row arrangement in alternate directions so that both the X and Y currents are applied to the elements 14 in the same direction.

Figure 6:
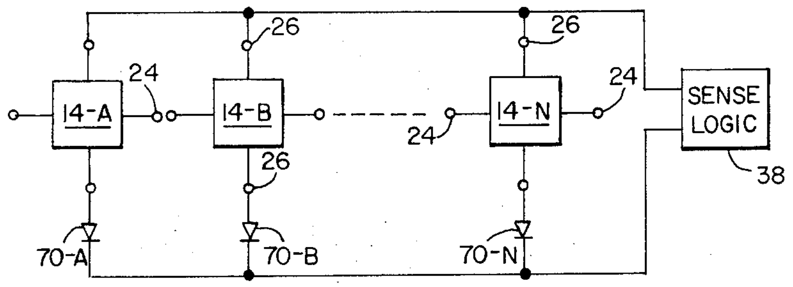
FIG. 6 is a schematic block diagram illustrating a signal readout improvement for parallel connected Hall probe elements.

In operation, Hall probe element 14–1 is energized by means of a half-energize current on line 54 and a half-energize current on line 56. Thus a full-energize current is applied to Hall probe element 14–1. Half-energize currents are applied to Hall probe elements 14–2, 14–3, 14–4, and 14–5. If we assume that a single wall domain is stored in the location in alignment with Hall probe element 14–1 and that single wall domains are not stored in alignment with the other Hall probe elements receiving half-energize currents, a first polarity voltage will be produced by Hall probe element 14–1 only (such voltage to be referred to as voltage E) and will be sensed by sense logic 38. The other elements will generate voltages having a second polarity. Depending on the magnitude of the first polarity voltage indicative of the presence of a single wall domain and the magnitude of the second polarity voltage indicative of the absence of a single wall domain, an isolation device such as a diode may have to be coupled with each element 14 as is shown in FIG. 6. If the magnitudes of the first and second polarity voltages are substantially different, then each diode would not necessarily be required. However, if such magnitudes are substantially the same order of magnitude and depending on the array size, such diodes would be required. Otherwise the voltages may tend to cancel giving an erroneous indication. If on the other hand Hall probe element 14–1 senses a single wall domain and one or more of the other Hall probe elements 14–2 through 14–5 also senses a single wall domain, the voltages produced by such latter elements which are coupled in parallel with the voltage E produced by element 14–1, will not, depending on magnitudes of the second polarity voltages, substantially vary the voltage E produced by Hall probe element 14–1 which is the element selected.

In explanation of further operation of the embodiment of FIG. 5, if Hall probe element 14–1 is energized with a full-energize current and a single wall domain is absent from such position, a second polarity voltage is produced by element 14–1. If each of the other Hall probe elements 14–2 through 14–5 also sense the absence of a single wall domain, only a second polarity voltage will be sensed by the sense logic 38. Such second polarity voltage indicates the absence of a single wall domain. Further, if Hall probe element 14–1 is energized and senses the absence of a single wall domain and one or more of the other Hall probe elements receiving a half-energize current does sense a single wall domain, a voltage having a magnitude approximately one-half of that produced by an element receiving full energize currents will be produced by the elements receiving the half-energize current and having a domain at that position. This half voltage will be sensed by sense logic 38.

Thus when a Hall probe element is energized in any way, the sense logic 38 must distinguish between the first polarity voltage E representing the presence of a single wall domain at a fully selected element and a voltage which may range between zero voltage and a voltage of E/2. Consideration of the second polarity voltage must also be made as previously discussed. A threshold circuit which may be adapted is well known in the art and may be set to sense a voltage which is greater than voltage E/2 or less than voltage E. For example a threshold voltage such as ¾E may be selected. Integration and corelation circuits may also be used in the readout process. Thus in the matrix arrangement shown in FIG. 5, a single Hall element may be selectively energized as is common for magnetic core memories and such fully energized Hall probe element is sensed by a sense wire which is common to each of the Hall probe elements in the matrix.

It should be understood that isolation devices such as diodes may be coupled in the matrices of the embodiments of the invention in order to provide an improved signal or voltage to be sensed by the sense logic 38. This is shown in FIG. 6 wherein Hall probe elements 14–A through 14–N having their sense terminals 26–A through 26–N connected in parallel also include diodes 70–A through 70–N connected to one of the pair of terminals 26 for each element 14. The diodes may thus be used in the embodiments shown in FIGS. 2,3 and 5 when a sufficient amount of elements 14 are in parallel connection. The diodes are connected in a direction dependent on the polarity of the read current to control terminals 24 and the direction of the magnetic field. In this way the elements not receiving read currents tend not to attenuate the readout signal. The voltage supplied across the diode must be greater than the threshold voltage of the diode for those elements energized. These diodes are especially useful in the embodiment of FIG. 6. In such embodiment, the diode would be oriented to pass only the first polarity voltages above the diode threshold value. The second polarity voltages would not be passed thereby eliminating any erroneous readout. Also, the contiguous placement of the first sheet 10 and the second sheet 12 of material may be made so that the direction of the magnetic field produced by a single wall domain enhances the Hall probe element voltage readout.

Having now described the invention what is claimed as new and novel and for which it is desired to secure Letters Patent is:

1. The combination comprising:

A. a first sheet of material in which single wall domains can be maintained at determinate stable positions;

B. a second sheet of material overlying said first sheet and including a plurality of Hall probe elements each in substantial alignment with one of said determinate stable positions, each of said elements including a pair of spaced electrical control connections in one direction and a pair of spaced electrical sense connections in a direction transverse to said one direction;

C. means for providing current to said control connections of certain ones of said elements thereby energizing said certain ones of said elements; and D. means, coupled to said sense connections of selected ones of said elements, for sensing the presence or absence of said single wall domains when certain ones of said elements are energized.

2. The combination as defined in claim 1 wherein said single wall domains are capable of movement between said determinate stable positions.

3. The combination as defined in claim 1 wherein:

A. each of said elements have said sense terminals thereof coupled in parallel circuit with each other;

B. said means for providing current includes means for providing two coincident currents to a predetermined one of said elements thereby producing a first voltage of first polarity at said sense terminals of said predetermined one of said elements when sensing the presence of a single wall domain and producing a second polarity voltage when sensing the absence of a single wall domain;

C. said elements receiving only one of said two coincident currents producing a second voltage of first polarity at said sense terminals thereof when sensing the presence of a single wall domain, said second voltage being less than said first voltage, and producing a second polarity voltage when sensing the absence of a single wall domain; and D. said means for sensing adapted to respond to said first voltage but not to said second voltage, nor said second polarity voltage, said response indicating the presence of a single wall domain at the position of said predetermined one of said elements receiving said coincident currents.

4. The combination as defined in claim 1 wherein:

A. said Hall probe elements are arranged in a row and column matrix configuration;

B. each of said elements have said sense terminals thereof coupled in parallel circuit with each other;

C. said means for sensing is adapted to respond to a second voltage of first polarity which is greater than a first voltage, said response to said second voltage indicating the presence of a single wall domain;

D. said means for providing current includes a means for providing a first current to a selected row of said elements and a means for providing a second current to a selected column of said elements;

E. said first current through one of said elements producing a third voltage at said sense terminals thereof and said second current through one of said elements producing a fourth voltage at said sense terminals thereof, either of said third voltage or said fourth voltage being less than said first voltage; and F. said first and second currents simultaneously provided through one of said elements producing a fifth voltage of first polarity at said sense terminals thereof when sensing the presence of a single wall domain, said fifth voltage being equal to or greater than said second voltage and producing a second polarity voltage at sense terminals thereof when sensing the absence of a single wall domain.

5. The combination as defined in claim 4 further comprising isolation means coupled in circuit with each of said elements so that only said voltages of first polarity are passed therefrom and to said means for sensing.

6. The combination as defined in claim 1 wherein:

A. said Hall probe elements are arranged in a row and column matrix configuration, said selected ones of said elements included in said columns and said certain ones of said elements included in said rows;

B. said means for providing current is coupled to selectively provide current to one of said rows of said elements; and C. said means for sensing includes a plurality of sense circuits each coupled to a column of said elements.

7. The combination as defined in claim 6 wherein:

A. each of said elements included in a row have said control terminals thereof coupled in series circuit with each other and said means for providing current; and B. each of said elements included in a column have said sense terminals thereof coupled in parallel circuit with each other.

8. The combination as defined in claim 6 wherein:

A. each of said elements included in a row have said control terminals thereof coupled in parallel circuit with each other and said means for providing current; and B. each of said elements included in a column have said sense terminals thereof coupled in parallel circuit with each other.

9. The combination as defined in claim 6 wherein:

A. each of said elements included in a row have said control terminals thereof coupled in series circuit with each other and said means for providing current; and B. each of said elements included in a column have said sense terminals thereof coupled in series circuit with each other.

10. The combination as defined in claim 6 wherein:

A. each of said elements included in a row have said control terminals thereof coupled in parallel circuit with each other and said means for providing current; and B. each of said elements included in a column have said sense terminals thereof coupled in series circuit with each other.

11. The combination comprising:

A. a first sheet of magnetic material which is generally magnetized in a particular direction perpendicular to the two surfaces of said sheet and which includes small regions in which the magnetization is in a direction opposite said particular direction;

B. a second sheet of material overlying said first sheet and including a plurality of elements each generating a voltage across opposite edges of said element in response to current applied in a direction substantially transverse said opposite edges when said element is placed in a magnetic field, each of said elements in substantial alignment with one of said regions;

C. means for providing current to certain ones of said elements thereby energizing said certain ones of said elements; and D. means for sensing said voltage across said opposite edges of selected ones of said elements.

* * * * *